United States Patent
Le Rolland et al.

(10) Patent No.: US 12,032,692 B2
(45) Date of Patent: Jul. 9, 2024

(54) DEVICE AND METHOD FOR PROTECTING A MEMORY

(71) Applicant: SECURE-IC SAS, Cesson-Sevigne (FR)

(72) Inventors: Michel Le Rolland, Ploermel (FR); Sylvain Guilley, Paris (FR); Adrien Facon, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 405 days.

(21) Appl. No.: 17/414,910

(22) PCT Filed: Dec. 20, 2019

(86) PCT No.: PCT/EP2019/086849
§ 371 (c)(1),
(2) Date: Jun. 16, 2021

(87) PCT Pub. No.: WO2020/136141
PCT Pub. Date: Jul. 2, 2020

(65) Prior Publication Data
US 2022/0067157 A1    Mar. 3, 2022

(30) Foreign Application Priority Data
Dec. 27, 2018   (EP) .................................... 18306854

(51) Int. Cl.
*G06F 3/06* (2006.01)
*G06F 21/56* (2013.01)
(52) U.S. Cl.
CPC ............ *G06F 21/56* (2013.01); *G06F 3/0622* (2013.01); *G06F 3/0659* (2013.01); *G06F 3/0673* (2013.01)

(58) Field of Classification Search
CPC ...... G06F 21/56; G06F 3/0622; G06F 3/0659; G06F 3/0673; G06F 12/1408;
(Continued)

(56) References Cited

U.S. PATENT DOCUMENTS

| | | | |
|---|---|---|---|
| 4,460,958 A * | 7/1984 | Christopher | G11C 8/12 711/E12.003 |
| 9,397,834 B2 * | 7/2016 | Walrath | H04L 9/16 |

(Continued)

OTHER PUBLICATIONS

Bhattacharya, et al., "Curious Case of Rowhammer: Flipping Secret Exponent Bits Using Timing Analysis", International Association for Cryptologic Research 2016, pp. 602-624, Nov. 6, 2016.
(Continued)

*Primary Examiner* — Farid Homayounmehr
*Assistant Examiner* — Mudasiru K Olaegbe
(74) *Attorney, Agent, or Firm* — BakerHostetler

(57) ABSTRACT

Embodiments provide a memory device including a memory comprising at least one chip, each chip comprising one or more banks for storing a plurality of bits, each bank comprising a set of rows and columns, each row and column comprising a number of bits, the device further comprising a controller configured to generate access commands to the memory, an access command identifying an address corresponding to a given row of the memory and a command operation to be performed on the given row, wherein the device further comprises a protection device. The protection device is configured to transform an address, in response to the receipt of an access command identifying the address, into a transformed address. The protection device uses an address storage data structure, such as a histogram, to store the transformed address depending on a frequency of access associated with the address, the address storage data structure being reset in response to a memory protection operation (refresh for example) performed in the memory device.

(Continued)

The protection device further comprises an access frequency manager configured to determine whether the access frequency associated with an address maintained in the address storage data structure is greater or equal to a threshold, and if so trigger a memory protection operation in the memory from within the memory.

14 Claims, 6 Drawing Sheets

(58) Field of Classification Search
CPC ............. G06F 21/85; G06F 2212/1032; G06F 2212/1052; G11C 8/20; G11C 11/406; G11C 11/408; G11C 7/24
See application file for complete search history.

(56) References Cited

U.S. PATENT DOCUMENTS

| | | | |
|---|---|---|---|
| 9,478,263 B2* | 10/2016 | Ni | G11C 7/1072 |
| 2015/0200002 A1* | 7/2015 | Lin | G11C 11/40618 |
| | | | 711/106 |
| 2018/0006767 A1* | 1/2018 | Litsyn | H04N 9/8047 |
| 2019/0129651 A1* | 5/2019 | Wuu | G06F 3/0673 |
| 2020/0027497 A1* | 1/2020 | Shin | G06F 3/0659 |

OTHER PUBLICATIONS

Kim, et al., "Flipping Bits in Memory Without Accessing Them: An Experimental Study of DRAM Disturbance Errors", Proceeding of the 41st annual international symposium on Computer architecture, Jun. 2014.

Seaborn, et al., "Exploiting the DRAM rowhammer bug to gain kernel privileges", Project Zero, Google, Retrieved Mar. 10, 2015, https://googleprojectzero.blogspot.com/2015/03/exploiting-dram-rowhammer-bug-to-gain.html.

Bogdanov, et al., "Present: An Ultra-Lightweight Block Cipher", CHES 2007, vol. 4727 of LNCS, pp. 450-466, 2007.

* cited by examiner

DEVICE AND METHOD FOR PROTECTING A MEMORY

CROSS-REFERENCE TO RELATED APPLICATIONS

This application is a National Stage of International patent application PCT/EP2019/086849, filed on Dec. 20, 2019, which claims priority to foreign European patent application No. EP 18306854.3, filed on Dec. 27, 2018, the disclosures of which are incorporated by reference in their entirety.

TECHNICAL FIELD

The invention generally relates to memory devices and, in particular, to a device and methods for protecting a memory having a protection memory function.

BACKGROUND

Modern computing systems and devices require more and more storage capacity with increased processing performances. In particular, memories having a memory protection function, such as a refresh, are widely used in various high-speed, memory demanding applications, such as graphic cards, as well as in networking and communications applications executing various with tasks.

However, such memories are vulnerable to some types of side-channel attacks. For example, Dual-Data-Rate (DDR) memories are particularly exposed to fault injection attacks which consist in the injection of deliberate (or "malicious") faults into the DDR memory using an injection technique, and the observation of the corresponding erroneous outputs to extract or modified the information stored on memories. One type of fault injection attack is known as a Row Hammer attack. A Row Hammer attack can include the basis row hammer attack or its variant Double-sided Row Hammer attack. A Row Hammer attack can cause a failure in DDR memories by repeatedly accessing a single row of memory within the refresh window of the memory cell. As a result, the physically adjacent wordline to the accessed row has a very high probability of experiencing data corruption. The row hammering can cause DDR memory cells to leak their charges and interact electrically between themselves, possibly altering the contents of nearby memory rows (non-accessed physically adjacent rows) that were not addressed in the original memory access, due to excessive number of accesses to DDR memory between two refreshes.

A Row Hammer attack accordingly uses rapid row activations of accessed cell which may cause a change of the values of the bits stored in non-accessed neighboring row. A Row Hammer attack thus exploits DDR defects to get unrestricted access to the DDR content, thereby allowing unauthorized read/write access to the DDR memory.

Different techniques exist to prevent the Row Hammer effect from occurring. Some existing solutions are based on Error Correcting Codes (ECC), on a refresh of all rows frequently, or on Probabilistic Adjacent Row Activation (PARA) as disclosed for example in:

Yoongu Kim; Ross Daly; Jeremie Kim; Chris Fallin; Ji Hye Lee; Donghyuk Lee; Chris Wilkerson; Konrad Lai; Onur Mutlu (Jun. 24, 2014). "Flipping Bits in Memory Without Accessing Them: An experimental Study of DRAM Disturbance Errors". Ece.cmu.edu. IEEE. Retrieved Mar. 10, 2015.

Mark Seaborn; Thomas Dulien (Mar. 9, 2015), "Exploiting the DRAM rowhammer bug to gain kernel privileges". Googleprojectzero.blogspot.com. Google, Retrieved Mar. 10, 2015.

Sarani Bhattacharya; Debdeep Mukhopadhyay (Aug. 4, 2016), "Curious Case of Rowhammer: Flipping Secret Exponent Bits using Timing Analysis". eprint.iacr.org/2016. Retrieved Nov. 6, 2017.

However such approaches are costly. In particular, although ECC allows fixing bit flips, an ECC based protection against Row Hammer attacks requires a memory space devoted to ECC. Accordingly, the protection scales linearly with the amount of memory. Further, the detection capability is limited (maximum two error bits) and costly (as part of the memory is devoted to ECC, the protection scales linearly with the amount of memory). For example, to add ECC in a conventional DDR3 DIMM standard 64bits (8×8), 72bits (8×9) must be used.

Also, an ECC based protection against Row Hammer attacks is only a safety protection in the sense that it does not protect against a determined attacker. This thus requires verification (e.g. additional ECC) on the CPU side of the DDR chips. As a result, the solutions based on ECC do not allow protecting the CPU of the DDR chips. The DDR chips are accordingly insecure.

Further, although the solutions based on a refresh of all rows frequently and on Probabilistic Adjacent Row Activation (PARA) present a low area overhead, they have a high cost in terms of performance.

Indeed, with a frequent refresh of all rows, when the memory is under a refresh, the system cannot access the memory. As a result, an increase of the duration between two refreshes is generally performed by manufacturers.

In the Probabilistic Adjacent Row Activation (PARA) approach, to try to reduce the costs in terms of performance, a refresh is only activated on specific rows, corresponding to the rows which are adjacent to an accessed row with a low probability. However, such solution requires generating unnecessary refreshes, and accordingly has additional costs in terms of performance.

Conventional approaches for preventing Row Hammer effect are thus either based on empowering DDR chips to natively resist Row Hammer attacks, or on a costly upstream detection of Row Hammer attacks.

Accordingly, there is a need for improved protection of memories having memory protection functions against Row Hammer attacks.

SUMMARY

In order to overcome these and other problems, there is provided a memory device comprising a memory comprising at least one chip, each chip comprising one or more banks for storing a plurality of bits, each bank comprising a set of rows and columns, each row and column comprising a number of bits, the device further comprising a controller configured to generate access commands to the memory, an access command identifying an address corresponding to a given row of the memory and a command operation to be performed on the given row. The memory device further comprises a protection device, the protection device comprising:

a transformation unit configured to apply a transformation function in response to the receipt of an access command identifying an address, to transform said address into a transformed address;

an address storage data structure configured to store the transformed address depending on a frequency of access associated with the address, the address storage data structure being reset in response to a memory protection operation performed in the memory device.

The protection device further comprises an access frequency manager configured to determine whether the access frequency associated with an address maintained in the address storage data structure is greater or equal to a threshold, and if so trigger a memory protection operation in the memory from within the memory.

In one embodiment, the protection device may comprise at least one access counter, the at least one access counter being configured to count the access command related to a given address between two memory protection operations of the memory, the frequency of access associated with the address being determined using the counter value.

In some embodiments, the protection device may comprise one access counter in association with each address.

The memory device may operate according to a clock cycle and the transformation function may be a balanced and non injective function defined from the memory size to $\alpha(N/H)$ words, a being an integer strictly greater than 1, N denoting the number of clock cycles between two memory protection operations and H denoting the average number of times a Row Hammer attack shall access one address to fault it.

In one embodiment, the transformation function may be a hash function or an encryption function.

In particular, the transformation function may be configured to process one address per clock cycle.

Advantageously, the protection device 3 further may comprise a scrambler configured to scramble at least some selected bits of an address identified in an access command received by the memory.

The selected bits may comprise the Least Significant Bits of the address.

In one embodiment, address scrambling by the scrambler may be triggered based on a condition related to the access frequency associated with the address.

In some embodiments, the memory device may comprise a processor, the address scrambling by the scrambler being triggered by the processor of the memory device.

Address scrambling by the scrambler may be performed using a bit sequence generated by an embedded Random Number Generator.

In one embodiment, the scrambler may implement a permutation of the Least Significant Bits (LSB) of the address.

The scrambler may use a random codeword selected from a linear affine code having a minimum distance higher or equal to a predefined value d.

In some embodiments, the protection device may be implemented in the memory or in the controller.

In one embodiment, the memory protection operation may be a refresh operation.

There is further provided a method for protecting a memory, the memory comprising at least one chip, each chip comprising one or more banks for storing a plurality of bits, each bank comprising a set of rows and columns, each row and column comprising a number of bits, the device further comprising a controller configured to generate access commands to the memory, an access command identifying an address corresponding to a given row of the memory and a command operation to be performed on the given row. Advantageously, the method may comprise:

applying a transformation function configured to transform an address, in response to the receipt of an access command identifying the address, into a transformed address;

storing the transformed address in an address storage data structure depending on a frequency of access associated with the address, the address storage data structure being reset in response to a memory protection operation performed in the memory device.

The method further comprises determining whether the access frequency associated with an address maintained in the address storage data structure is greater or equal to a threshold, and if so triggering a memory protection operation in the memory from within the memory.

The various embodiments of the invention provide DDR memories which are resistant to Row Hammer attacks, which obviates the need for an upstream detection of the attacks. Further, the DDR memories according to the embodiments of the invention make Row Hammer attack exploitation very difficult, in a quantifiable way.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
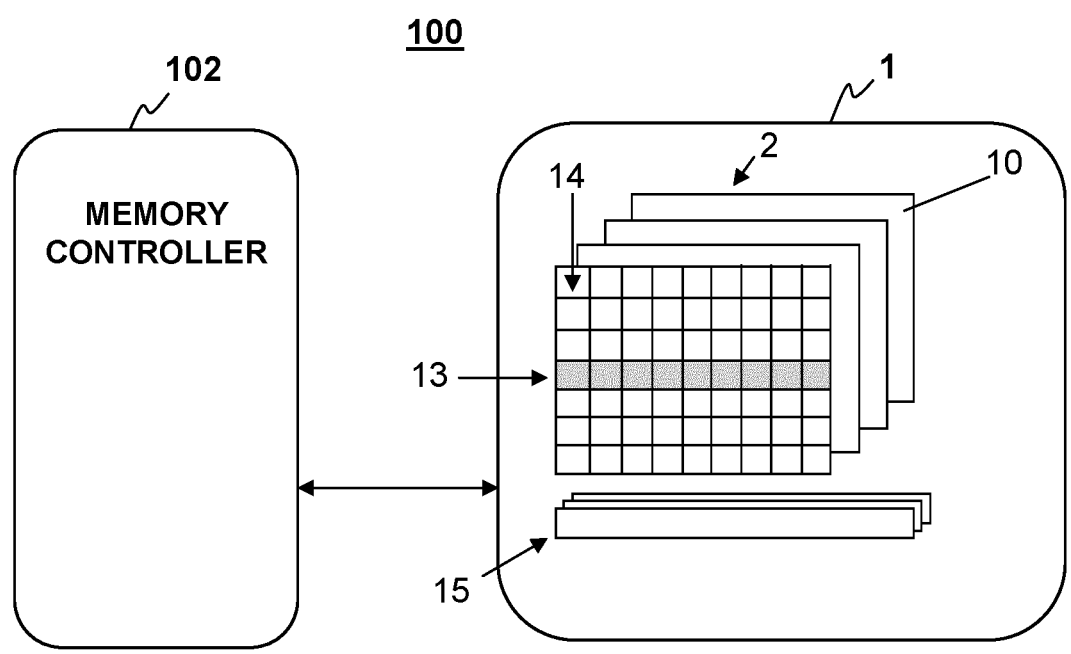
FIG. 1 is a diagrammatic view of a memory device.

Referring to FIG. 1, there is shown a memory device 100 in accordance with some embodiments of the invention.

The memory device 100 comprise a memory 1 organized as a matrix, where data bits are stored at the intersection of the rows and columns.

More specifically the memory 1 may comprise one or more chips (or modules) 2, each having a multibank architecture. Only one chip 2 is represented in FIG. 1 for illustration purpose only. Each chip 2 may comprise one or more banks 10 for storing a plurality of bits. Each bank 10 has a dimension n×p and comprises a set of rows 13 and columns 4. Accordingly, each row 13 (also called 'line') comprises a number of bits defined by a row size n, and each column 14 comprises a number of bits defined by a column size p.

The memory 1 may be any memory which has a memory protection function such as a refresh function. Memory 1 may be for example a volatile memory such as a RAM based memory, which may be for instance a DRAM OR DDR memory. The following description of some embodiments of the invention will be made with reference to a memory 1 of DDR type for illustration purpose only. However the skilled person will readily understand that the invention generally applies to any memory having a refresh function.

The memory protection function designates any function (or operation) that can be implemented to protect the memory to prevent or stop a degradation of the memory, such as a function consisting in cutting the access to the memory, or a refresh function. As used herein a refresh function (or refresh operation) designates a function consisting in resetting the state of the memory.

The following description of some embodiments will be made mainly with reference to a memory protection operation of the type refresh operation, for illustration purpose only. However, the skilled person will readily understand that the invention generally applies to a memory protection function or operation.

A row 13 can be selected by a horizontal word line. Each row comprises one or more transistors. In response to receiving a logical high signal, the transistors of the rows are enabled and connect a storage capacitor to a corresponding vertical bit line. The vertical bit line is connected to a sense amplifier that provides an amplified signal by amplifying a small voltage change generated by the storage capacitor. The memory device 100 then outputs the amplified and the bit line is driven back to refresh the row. If no word line is active, the memory array is idle and the bit lines are maintained in a precharged state.

To access memory, a row must first be selected and loaded into the sense amplifiers. This row is then active, and columns may be accessed for read or write.

The memory 1 may further comprise a row buffer 15 in association with each bank 10. The memory device 100 may also comprise a memory device controller 102 to control activation of the bank rows 3, and read/write operations.

Each memory bank 10 may be addressed by both a row and column address.

An activate command may be issued by the memory device controller 102 to activate a given row in a specified bank 10. To activate a given row 13 of a memory bank 10 identified by a row address, the requested row may be activated and copied into the row buffer 15 associated with the memory bank 10 of the given row. The memory device 10 may be set in an active state in response to an active command.

In an active state of the memory device 100, read and/or write operations may be performed. To perform read and/or write operations, bursts of data may be issued to the activated row.

The columns 14 may be used during a read or write command to point to the specific address within an open page for the read/write operation. As used herein, a "page" (or "memory page") refers to a block of data stored within a same row of the DDR 1.

In order to address a row of a DDR memory (memory page), a command may specify a memory bank 10 and the row address. When a memory bank 10 is active, an 'open' page is associated with the buffer 15 of the bank.

Pages remain open in the buffer 15 until a different page needs to be opened to access a different address.

A read command may be issued by the memory device controller 102 to initiate a read of a data burst to an active row. To read a burst of data stored in a given row identified by a row address, the row may be charged in the row buffer 15 and read.

To read from the memory 1, the controller 102 may identify the chip 2, the bank 10 and the row 13 that are to be addressed in the memory 1 by issuing an active command to the memory 1. In response to the active command, the memory 1 may output an entire row of data via one or more sense amplifiers. The addressed memory chip 2 may then accept read commands. A read command may comprise a column address. The memory 1 may decode the column address of a read command to select the data to be read, and output the read data using the sense amplifiers. The memory 1 may then return to an idle state, in response to a precharge command issued by the memory controller 102 to the memory 1.

A write command may be issued by the memory device controller 102 to initiate a write of a data burst to an active row 13. To write a burst of data into a given row 13 identified by a row address, the burst of data may be stored in the row buffer 15 and write back to the corresponding row 13.

In response to refresh command from the memory device controller 102, a refresh operation may be initiated. A refresh operation may comprise precharching all banks 10, which involves closing the rows 13 of all banks 10. The memory device 10 may be set in an idle state in response to precharging.

The time between two refreshes of such a memory chip 10 may be fixed. After a refresh, the memory points are strong and hence immune to hammering. After a new number of accesses, the memory points can become vulnerable again to hammering. A Row Hammer attack can thus be effective if the attacker manages to access (i.e. read or write) a sufficient number of times a same address, between two refreshes.

The number of clock cycles between two refreshes is denoted N. In theory, the memory can be accessed at most N times in this time interval. As used herein, the term 'clock cycle' refers to the clock cycle according to which the DDR memory device 100 operates.

The average number of times an attack shall access one address to fault the memory device 100 (or neighbors with high probability) is denoted H. The security problem of Row Hammer is theoretically that H>N. Accordingly, in conventional DDR memories, an attacker might inject faults in the memory device 100 by always accessing the same address. It should be noted that in practice, it is difficult to access the memory device 100 at each clock cycle, because of cache memories which "remember" already accessed data, and immediately return the memorized value by querying the memory device 100 again. For a Row Hammer attacker, a workaround consists in flushing the cache line, which can be repeated with a frequency of about once per hundred clock cycles. In a conservative approach, it is assumed that a Row Hammer attacker can access once per clock cycle. An alternative attack is called double-sided hammering, whereby the attacker focuses on faulting address a by successively accessing addresses a−1 and a+1.

Accordingly, it has been determined that an attack can be stopped if the attacker cannot access more than H times an address (or addresses at distance two).

The memory device 100 according to the various embodiments of the invention improves the protection of the memory 1 against Row Hammer Attacks including adaptive attacks.

Figure 2:
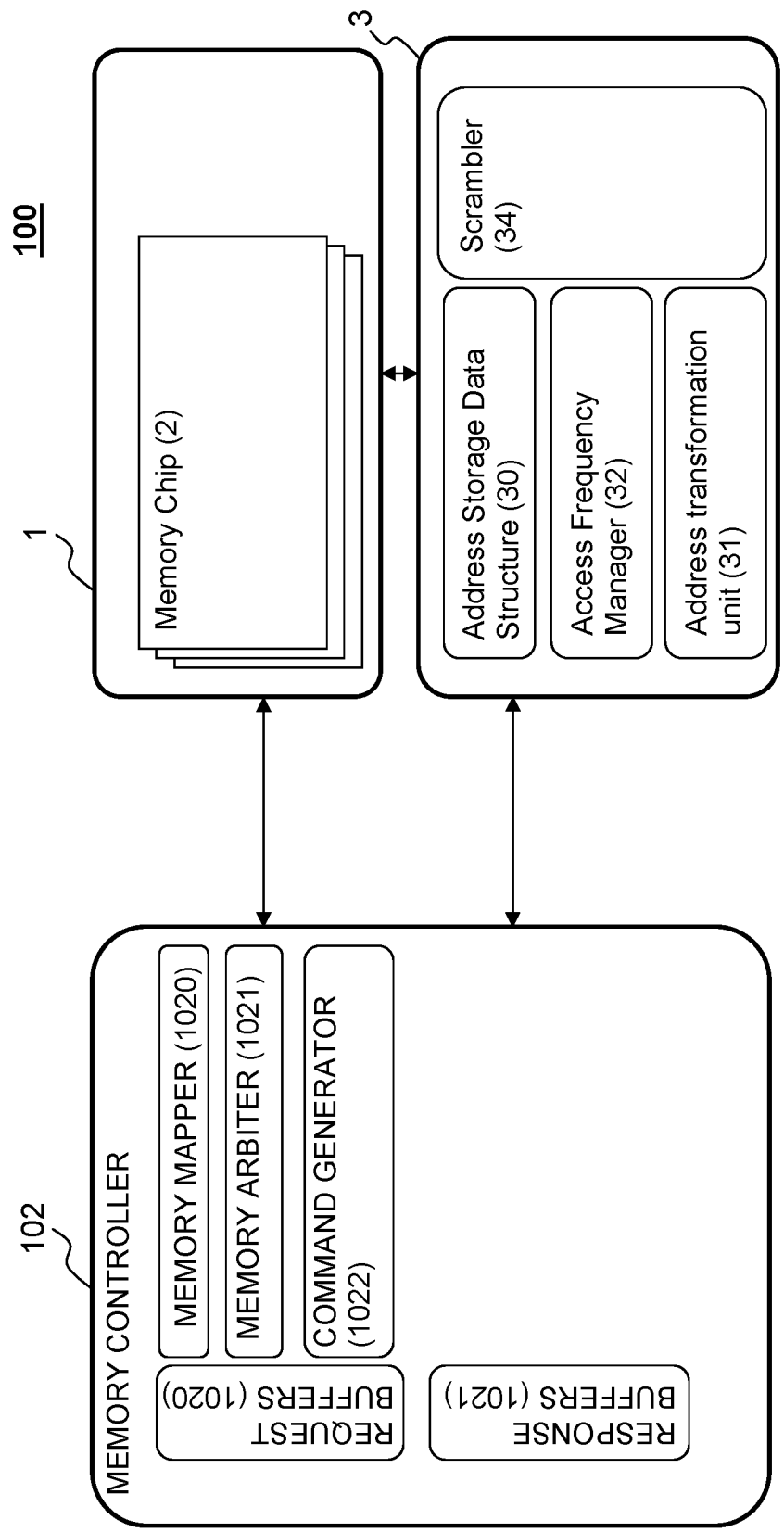
FIG. 2 is a diagrammatic view of a memory device, according to some embodiments.

FIG. 2 depicts a memory device 100 according to some embodiments.

The memory device 100 may comprise a protection unit 3 configured to protect the memory device 100 against fault injections attacks of DDR type. The protection unit 3 may comprise an accessed address storage data structure 30, such as one or more access histograms, configured to maintain, for each memory chip 2, a list of the top accessed addresses (or lines) between two refresh cycles (or more generally between two memory protection operation cycles) using a balanced and non-injective transformation function F configured to determine an image of an address (also called 'transformed image') identified in an access command, the access command further specifying a command operation (e.g. read or write) and data on which the command operation as to be performed at the identified address. The following description of some embodiments will be made with reference to an accessed address storage data structure 30 of histogram type for illustration purpose.

Although the protection device 3 is depicted separately from the DDR controller 102 and from the Memory 1, it should be noted that in some embodiments the protection device may be implemented in the DDR controller 102 or in the memory 1.

To detect too numerous accesses to the same address, access histograms 30 exploiting a shadow memory of the same size as the functional memory 1 can be used. According to such approach, each address would be reset to zero upon refresh, and incremented (i.e. value is added one) at each access. If one value is equal to H, then an attack is detected.

Alternatively, to avoid instantiation of a new shadow memory of the same size as the functional memory 1, the memory need may be reduced from the size of the memory 1 to protect (which can be equal to several gigabytes) to N=H. According to such approach, the memory device 100 could track the most frequent accesses and monitor any new access to the memory 1 using an accessed address storage data structure 30 of queue type. In such memory reduction based approach, the management of the queue 30 may comprise the following steps:

- a first step comprising determining, for each requested access identifying an address, if the address has already been accessed by checking whether the address is stored in a queue;
- if so (the address is found in the queue), the address is suspected to be the target of an attack and is maintained in the queue, and an access counter is incremented. If the access counter is equal to H, then an action may be taken.
- if the address is not yet in the queue 30, then the address is inserted in the queue if there is some free room available and the oldest accesses address(es) (representing the oldest address(es) having the smallest number of accesses) is dropped to free space.

Such memory reduction based approach exploits the fact that an old access is unlikely to be the target of Row Hammer, since it is not accessed fastly enough.

However, it has been analyzed that such memory reduction based approach in not adapted to resist to adaptive attacks. Indeed, an attacker could for example access $$\frac{N}{H} - 1$$

addresses twice so as to fill up the queue with tagged frequent addresses. Any new address will eject the previous unique address. Hence hammering at a+1 and a−1 will not be detected, since access at a+1 will eject a−1 and vice-versa. Accordingly, an attack might bypass such protection.

To provide robust protection against Row Hammer attacks, the protection device 3 may comprise an access frequency manager 32 configured to detect from the accessed address storage data structure 30 when the access frequency associated with a given address is greater or equal to a predefined threshold using data related to the frequency of access of the addresses. The protection device 3 may comprise at least one access counter configured to determine to count the access command related to a given address between two refreshes of the DDR memory 1, data related to the frequency of access associated with an address being determined using the counter value. In one embodiment, each address may be associated with an access counter i configured to count the access to the address between two refreshes of the DDR memory 1. If the access frequency associated with the address is greater or equal to a predefined threshold, the access frequency manager 32 may trigger a refresh cycle from within the memory chip 2 instead of being triggered by the controller 102. This enables detection of Row Hammer Attacks.

In some embodiments, the memory device 100 may further comprise a scrambler 34 configured to scramble at least some selected bits of each address identifying in an access command to prevent row Hammer attacks. In one embodiment, the selected bits may comprise the Least Significant Bits of each access address. Each address scrambling operation may be triggered by the access frequency associated with the address (as determined using the access counter associated with the address) and/or by a particular pattern (for example to prevent two-sided Row-Hammer attacks). The protection device 3 is configured to execute the access command identifying the address, such as for example reading (if the command specifies a read operation) or writing (if the command specifies a 'write' operation) the data specified in the command to the scrambled address in the memory 1.

Advantageously, address scrambling may be dynamic scrambling. It may be programmed by the processor (CPU) of the memory device 100 or intrinsic (for example the scrambling may be performed using a bit sequence generated by an embedded Random Number Generator). In case the scrambling is programmed by the CPU, the CPU may send to the scrambler the instruction to ensure an address scrambling. As used herein, 'intrinsic' scrambling refers to embodiments in which the memory device 1 itself controls the address scrambling, for example by triggering the address scrambling at each reset of the memory device.

In some applications, the memory 1 may need to be refreshed periodically (e.g. every 64 ms). In conventional SDRAMs, no data can be transferred during refresh, while a refresh can require some times (typically around 70 nanoseconds or ns).

In some embodiments, at least some components of memory device 100 may be located on an Integrated Circuit IC such as an application-specific integrated circuit (ASIC), a programmable logic device (PLD), a field programmable gate array (FPGA), or a combination thereof. In some embodiments, the memory 1 may be external to the integrated circuit. The integrated circuit may include the memory controller 102.

The memory device controller 102 may comprise request buffers 1020 configured to buffer requests to be transmitted to the memory 1 and response buffers 1021 configured to buffer the responses received from the memory 1.

The memory device controller 102 may further comprise a memory mapper 1022 configured to decode a memory address identified by a memory request into a triplet of data identifying the corresponding bank 10, row 13, and column 14. The banks 10 may be identified by integer numbers (from zero to K, K−1 representing the number of banks).

Each row 13 may be identified by an integer number i ranging from zero to n−1. Each column 14 may be identified by a binary number representing the position of the column (for example '00', '01', '10', '11').

A memory address has a predefined bit length (for example 32 bits). A memory address may comprise:
- a Byte offset having a predefined length (for example 3 bit length);
- a bank select having a predefined bit length depending on the number of banks;
- a chip select having a predefined length depending on the number of chips used by the memory;
- a column select which varies depending on the memory size and type;
- a row select which varies depending on the memory size and type;

The memory device controller 102 may further comprise a command generator 1022 to generate command(s) to the memory device 1, a memory arbiter 1021 configured to manage the order according to which the received requests access to the memory 1 depending on an arbitration scheme, a data path (not shown) configured to transmit responses received from the memory device 1 to the response buffer of the memory controller 102. Although the memory arbiter 1021 is shown in FIG. 1 as residing in the memory controller 102, the skilled person will readily understand that the memory arbiter 1021 can reside in other components of the computer system external to the memory controller 102.

A command generated by the command generator may identify a command operation (e.g. READ, WRITE, ACTIVATE) and an address corresponding to the row(s) 13 and bank(s) 10 and derived from a received request.

In one embodiment, the memory device 100 may be a DDR (Double-Data-rate) based memory device, such as DDR, DDR2, DDR3 memories. The DDR based memories may be simply referred to hereinafter as a "DDR memory".

A DDR memory is configured to fetch data on both the rising and falling edge of a clock cycle, doubling the data rate for a given clock frequency. For example, in a DDR2 device the data transfer frequency is 200 MHz, with a bus speed of 100 MHz. It accordingly doubles the processing rate by making a data fetch on both the rising and the falling edge of a clock cycle.

A DDR memory is associated with a temporization property (or temporization number) which represents the number of clock pulses that takes the DDR memory to perform a given operation. The temporization property is represented by a number, the smaller the number, the faster the memory.

The temporization number may be associated with one of the following operations:
- A 'CL' or 'Column address strobe' (CAS) latency representing the amount of time in clock cycles between the time at which the memory 1 is required by the memory device controller 102 to access a specified memory column and the time at which the requested data is returned (If a row has already been selected, the number of clock cycles needed before a result is returned after sending a column address to the memory device controller).
- A 'tRCD' or 'Row address strobe (RAS) to CAS delay' representing the amount of time in cycles between the time at which a row is activated and the time at which the column is activated via a CAS signal and data can be written to or read from a memory cell.
- A 'tRP' or 'RAS precharge' representing the amount of cycles required to disable one row access and begin the next row access.
- A 'tRAS' or 'Active to precharge delay' between the active and precharge commands, that is the number of clock cycles the memory device has to wait until the next access to memory can be initiated.
- 'CMD' or 'Command rate' represents the number of clock cycles between the memory device activation and the time at which a first command can be sent to the memory device.

When data is needed, the controller 102 may activate the RAS line to specify the row where the data is needed, and then activates the CAS line to specify the column.

Figure 3:
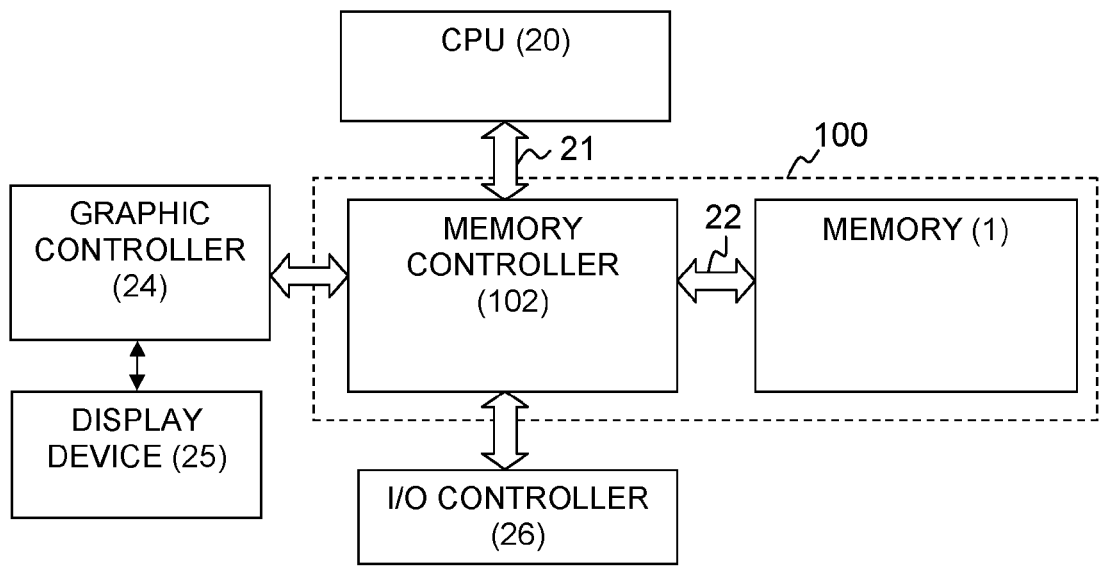
FIG. 3 depicts an exemplary operating environment in which the memory device may be implemented, according to one embodiment.

FIG. 3 illustrates an exemplary operating environment in which the memory device 100 may be implemented. The operating environment may comprise a CPU 20 and the memory device 100, with a memory 1 such as a DDR memory. The memory 1 may be used to store application programs, which can be executed by the CPU 20.

A row of the memory 1 may be accessed via a row address specified by the memory controller 102. The column address of the data being addressed may be then provided. Another column address can be used to access additional data within the row without providing the row address again (referred to as a "page hit"). In some embodiments, it is not required that the row address be provided for each column access.

The CPU 20 may initiate a read request to transfer data from the memory 1 to the CPU 20 or a write request to transfer data from the CPU to the memory 1. A memory request (read or write request for example) may be associated with auxiliary information such as information identifying the type of the command (read or write), or a priority indicator identifying the priority of the request.

The auxiliary information may be included in the memory request or transmitted in a separate message using a suitable communication protocol.

The CPU 20 may be connected to the memory controller 102 by a host bus 21. The memory controller 102 may be connected to the memory 1 by a memory bus 22. In some embodiments, the memory controller 102 may be further connected to a graphics controller 24 configured to manage access (store or retrieve operations) to a frame buffer storing graphics data in order to manage rendering of such data on a Graphical User Interface. The Graphical User Interface may be generated on any type of display device 25.

The memory controller 102 may be connected to an I/O (In/Out) controller 26 by an interface. The I/O controller may comprise interfaces to I/O devices. The I/O controller 26 may be configured to route I/O data transfer.

The various embodiments of the invention provide protection against fault injection attacks which use a huge number of accesses to the memory (1) between two refreshes to cause errors in the memory such as Row Hammer attack or a variant thereof (e.g. Double-sided Row Hammer attack).

Figure 4:
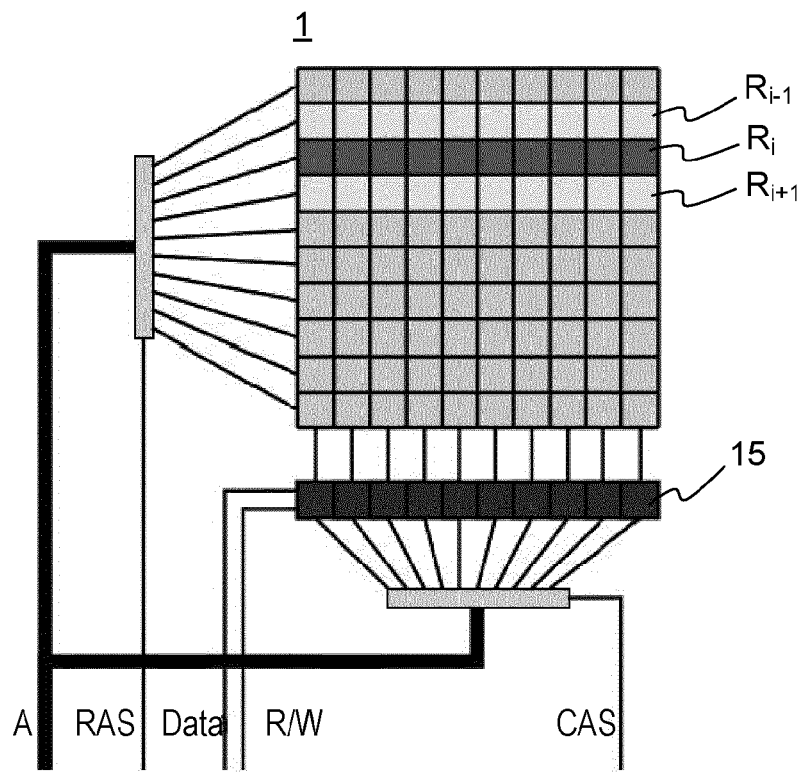
FIG. 4, illustrates an exemplary Double-Sided Row Hammer attack.

As shown in FIG. 4, which depicts an exemplary Double-Sided Row Hammer attack, such attacks generally use rapid row activations, for example in rows $13_{i-1}$ and $13_{i+1}$, which attempt to change the value of bits stored in a target row $13_i$ that is neighbor to the activated row $13_{i-1}$ and $13_{i+1}$.

Instead of detecting such attacks, which is costly, embodiments of the invention exploit the chancy faults for an attacker.

In one embodiment, to avoid blow-up in the size of the histogram 30, the size of histogram may be set to N/H with N denoting the number of clock cycles between two refreshes (the memory being theoretically accessible at most N times in such time interval) and H denoting the average number of times an attack shall access one address to fault the memory device 100 (or neighbors with high probability).

The balanced function F applied by the protection device 3 to the top accessed lines may be a non-injective from the memory size (e.g., $2^{64}$ words) to $\alpha(N/H)$ words, $\alpha$ being an integer strictly greater than 1. For example a can be equal to 10. As used herein, the term "balanced" indicates that the number of any preimage of the function is the same. For example, if $\alpha(N/H)=2^m$, then exactly $2^{64-m}$ words map to each histogram bin in $[0; \alpha(N/H)=2^m[$. If the N accesses are random, the counters in $[0;\alpha(N/H)[$ may be expected to be all equal to $H/\alpha$. Indeed, $$\frac{H}{\alpha} + \frac{H}{\alpha} + \ldots + \frac{H}{\alpha} = \alpha\left(\frac{N}{H}\right) \times \frac{H}{\alpha} = N.$$

Assuming that an attacker performs a Row Hammer attack, the attacker would need to hit at least H times a unique address. Accordingly, for one input in the histogram, there will be a value superior or equal to H ($\geq$H), wherein expected values are closer to $H/\alpha$. Such value, hit$\geq$H times, stands out in the histogram and attest of a Row Hammer attempt.

In one embodiment, to detect a Row Hammer, the access frequency manager 32 may determine if a repeated accesses to the same addresses increases a counter i beyond an expected value $H/\alpha$ (as $H>H/\alpha$). It should be noted that false positives can occur in such RowHammer detection while actually there is no attack attempt. This could happen for example if a benign program performs accesses within the set of preimages of a given histogram input. To avoid such false positives, the non-injective mapping performed by the balanced function F may be random, which makes it unpredictable to the attacker.

In some embodiments, the function F may be configured to process one address per clock cycle. The mapping function F may be 'pipelined', meaning that the process of transforming a top accessed address is launchable in one clock cycle, even though the final result is only outputted after a plurality of clock cycles. In one embodiment, the function F may be further 'full combinational', meaning that the process of process of transforming a top accessed address is terminated within one clock period.

In one embodiment, the function F may be a hash function (e.g. a keyed hash function) configured to truncate its output (output of the function F) to an expected bitwidth. This prevents an attacker from performing a second pre-image attack, which would allow him to hit always the same entry in the hash table (the hash table refers to the hash table used in connection with the hash function).

Alternatively, the function F may be an encryption function configured to compute a lightweight encryption on an accessed address and to drop bits resulting from such computation so as to match the expected bitwidth. The function F may be based on an encryption algorithm. As encryption algorithms are natively keyed, they respect the constraint of secrecy with respect to an attacker.

The function F may be for example a lightweight cryptographic function, such as the functions PRESENT (Andrey Bogdanov, Lars R. Knudsen, Gregor Leander, Christof Paar, Axel Poschmann, Matthew J. B. Robshaw, Yannick Seurin, and Charlotte Vikkelsoe. PRESENT: An Ultra-Lightweight Block Cipher. In CHES, volume 4727 of LNCS, pages 450-466. Springer, Sep. 10-13, 2007.

Vienna, Austria.), or a full-fledged encryption function, such as AES (Advanced Encryption Standard).

Using a hash function or an encryption function as the function F to transform top accessed addressed is particularly advantageous as such functions are iterative, and can accordingly be pipelined.

In another embodiment, the function F may consist in mapping the top accessed addresses (e.g. $2^{64}$ addresses) to a set of size p, where p is a secret random prime number selected to be smaller than $\alpha(N/H)$ while having a value close to $\alpha(N/H)$. Such mapping thus corresponds to a reduction modulo p.

In response to determining that the access frequency is beyond a given threshold, the access frequency manager 32 may trigger a refresh cycle from within the memory 1.

The scrambler 34 may perform address scrambling in parallel or any sequential order with respect to the operation of the access frequency manager 32.

As Row Hammer attacks tend to be deterministic, by using the scrambler 34 address data may be shuffled or linearly mixed the address data, thus preventing an attacker from predicting the effect of the fault.

In one embodiment, the scrambler 34 may perform permutation of at least some of the address bits of a given address. This permutation may be performed on the least significant bits (LSB) of the address. This number of bits may vary according to the desired level of protection and to the performance needs. With such protection, an attacker has to re-find after each scrambling where is located the target row ('victim' row) in the memory and which addresses are the adjacent ones.

Figure 5:
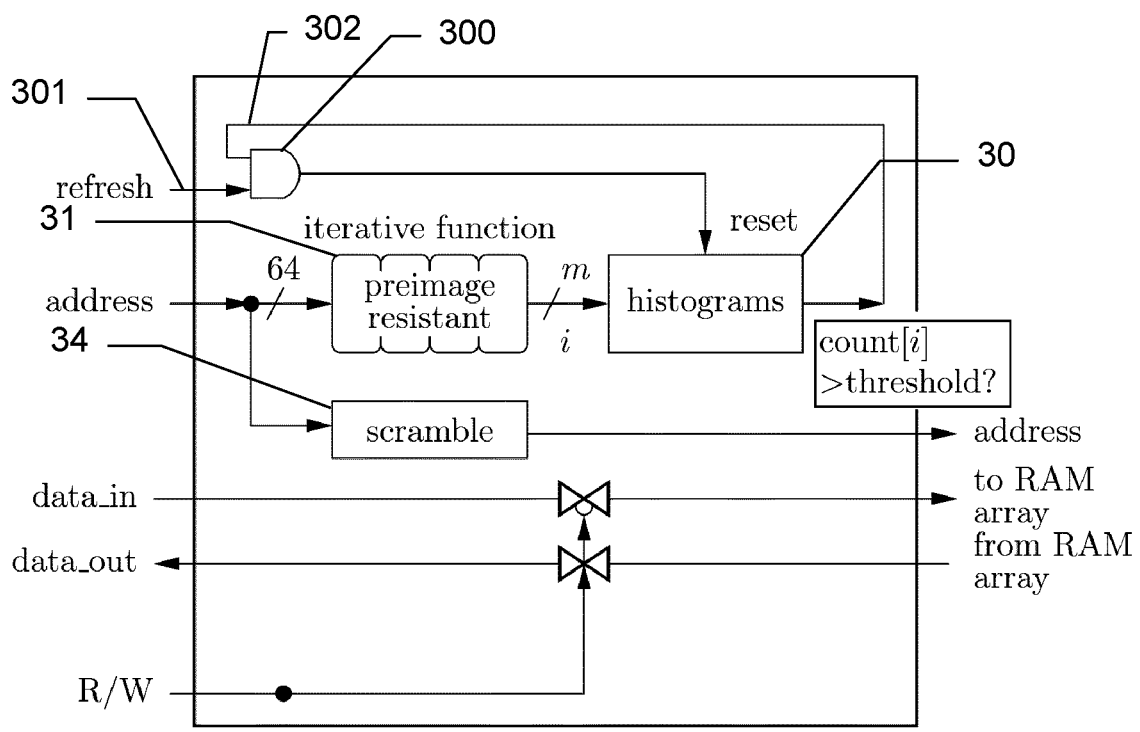
FIG. 5 is a logic circuit representing a protection device according to an exemplary hardware implementation.

FIG. 5 is a logic circuit representing a protection device 3 according to an exemplary hardware implementation.

The protection device 3 comprises a logic OR gate 300 receiving and input a refresh signal and a counter value "count i".

As shown in FIG. 5, if a Row Hammer attack is detected, then the DDR memory 1 is forced to refresh by performing an OR operation (logic OR gate 300) between the refresh line 301 and the external refresh wire 302, thereby causing the DDR memory 1 to refresh earlier than expected. It should be noted that in most DDR memories, it is not possible generally to control the refresh rate. Such control of the refresh rate is ensured by the DDR controller 102. However, the protection device 3 implements a number of logic (300, 301, 302) to be able to trigger (or force) the refresh.

The protection device may implement, orthogonally to the detection of Row Hammer attacks, a prevention countermeasure by use of the scrambler 34. The scrambler 34 may be configured to shuffle the Least Significant Bits (LSB) of an accessed address. In one embodiment, the scrambler 34 may implement a scrambling algorithm which is bijective. An exemplary scrambling algorithm may consist in choosing one random codeword from a linear affine code (as used herein an affine code is a coset of a linear code, a linear code mapping a zero (0) value to a zero (0) value), whose minimum distance is higher or equal to some value d. Such scrambler 34 avoids direct neighbors to be "row hammered" with a probability $2^d \ll 1$. However, the invention is not limited to such scrambling algorithm and may apply various bijective scrambling algorithms.

It should be noted that the step of constructing the histogram 32 and the step of performing physical access scrambling (as implemented by the scrambler 34) can be computed in parallel, thereby combining their security gain while not impacting negatively the performances.

Further, although described jointly in the present application, it should be noted that some aspects of the invention can be protected independently. In particular, the step of transforming an accessed address using the function F prior to storage of the transformed address in the histogram 30 and the step of performing physical access scrambling (as implemented by the scrambler 34) can be implemented independently in different implementations.

Figure 6:
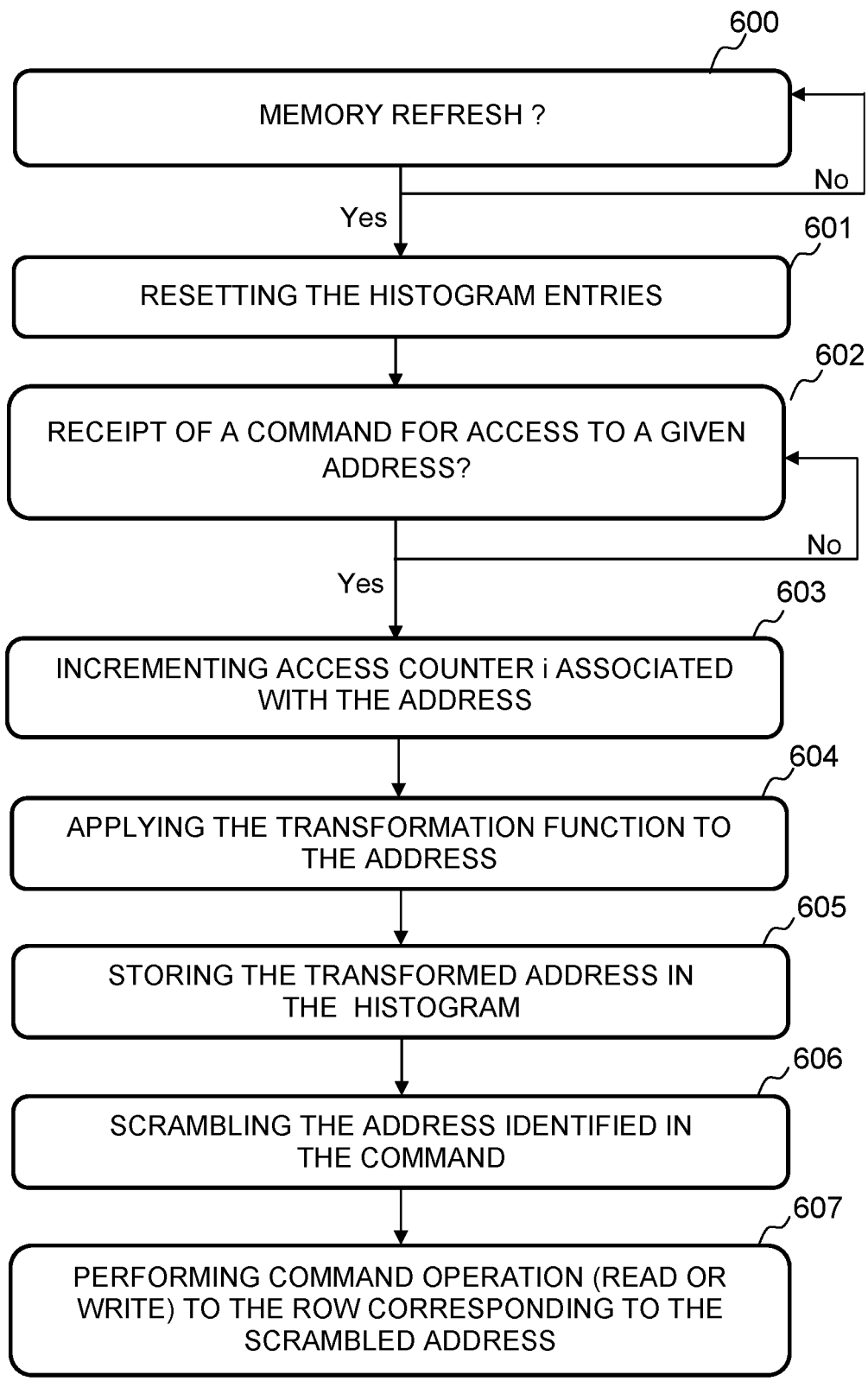
FIG. 6 is a flowchart depicting the protection method as implemented by the protection device according to some embodiments.

FIG. 6 is a flowchart depicting the protection method as implemented by the protection device according to some embodiments.

In step 601, in response to a refresh (block 600), the entries of the histogram 30 are reset, that is initialized to zero values (resetting step).

In step 603, in response to receipt of an access command requiring access to a given address (block 602), the access counter i associated with the address is incremented.

In step 604, an image of the address identified in the command is determined by applying the transformation function F.

In step 605, the image of the addressed (also called 'transformed address') is stored in the histogram.

In step 606, the address identified in the command received in step 603 may be scrambled. It should be noted that although step 606 is represented as being performed sequentially after step 605, alternatively, it may be implemented in parallel to any of the steps 604 and 605.

In step 607, the data corresponding to the access command are read (R) or write (W) to the row corresponding to the scrambled address depending on the operation (read or write for example) identified in the access command.

Figure 7:
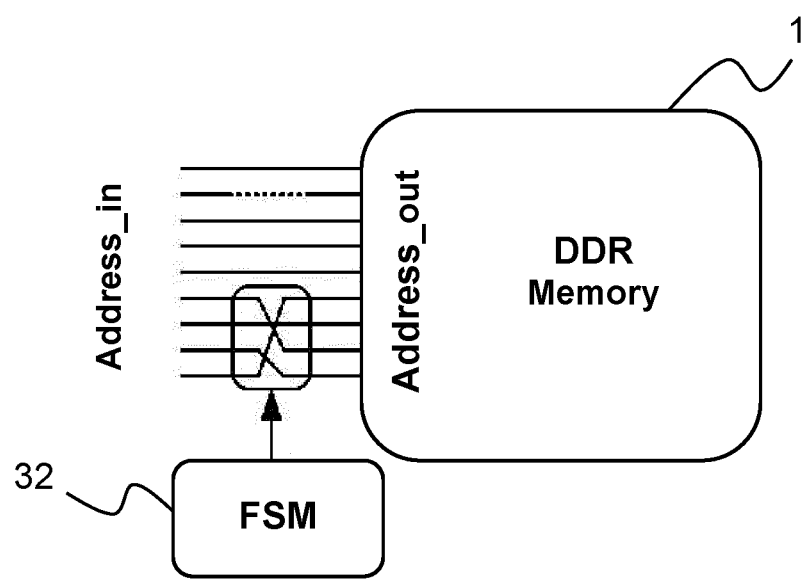
FIG. 7 depicts a scrambler according to an exemplary embodiment of the invention.

FIG. 7 depicts a scrambler 34 according to an exemplary embodiment of the invention.

In the example of FIG. 7, the scrambler 34 is configured to apply a permutation transformation to the Least Significant Bit of the accessed address. In another embodiment, scrambling may be performed for example by swapping a line and the less accessed line in another line which is not in the counters list.

The operation of scrambling an accessed addressed may be triggered at each boot of the system.

Alternatively, the operation of scrambling an accessed addressed may be triggered by the access frequency manager 32. For example, in the embodiment of FIG. 7, the access frequency manager 32 may be implemented by a Finite State Machine FSM configured to determine whether an access frequency associated with an accessed address stored in the histogram 30, determine if the access frequency associated with the access address is greater or equal to a predefined threshold TH, and if so trigger:

a refresh cycle of the DDR memory from within the DDR memory; and/or a scrambling of the accessed address (e.g. permutation).

The DDR memory 1 thus maintained scrambled addresses to make it hard for an attacker to hammer a row in its attack process next to the row that is the target of the attack.

Embodiments of the invention improve the protection of DDR memories. Embodiments of the invention may be implemented on the DDR memory 1 or on the DDR memory controller 102. Embodiments of the present invention can take the form of an embodiment containing software only, hardware only or both hardware and software elements. For example, it may be implemented in CMOS logic. Embodiments of the invention can be easily integrated to any DDR device. They provide quantifiable security gain. They make it difficult for an attacker to identify which lines are physically neighbour to a line subject to a row hammer attack. The protection method and device according to the embodiments of the invention thus ensure efficient deterrent protection against Row Hammer attacks. Although they can be applied for other types of attacks, the protection method and device according to the embodiments of the invention are particularly efficient against fault injection attacks, owing to the randomization of the RAM layout.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

It should be noted that the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

While embodiments of the invention have been illustrated by a description of various examples, and while these embodiments have been described in considerable detail, it is not the intent of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described.

The invention claimed is:

1. A memory device comprising a memory comprising at least one chip, each chip comprising one or more banks for storing a plurality of bits, each bank comprising a set of rows and columns, each row and column comprising a number of bits, the memory device further comprising a controller configured to generate access commands to the memory, an access command identifying an address corresponding to a given row of the memory and a command operation to be performed on said given row, wherein the memory device further comprises a protection device, said protection device comprising:

a transformation unit configured to apply a transformation function in response to a receipt of an access command identifying an address, to transform said address into a transformed address, wherein said transformation function is a balanced and non-injective transformation function;

an address storage data structure configured to store the transformed address depending on a frequency of access associated with said address, said address storage data structure being reset in response to a memory protection operation performed in the memory device; and the protection device further comprising an access frequency manager configured to determine whether an access frequency associated with an address maintained in the address storage data structure is greater or equal to a threshold, and if so trigger a memory protection operation in the memory from within the memory, wherein the access frequency manager comprises an access counter configured to count the accesses to said address between two memory protection operations of the memory, which provides a counter value, the access frequency associated with said address being determined using said counter value, wherein said memory protection operation is a refresh operation.

2. The memory device of claim 1, wherein the protection device comprises at least one access counter, said at least one access counter being configured to count the access command related to a given address between two memory protection operations of the memory, the frequency of access associated with said address being determined using the counter value.

3. The memory device of claim 2, wherein the protection device comprises one access counter in association with each address.

4. The memory device of claim 1, wherein the memory device operates according to a clock cycle and said transformation function is a balanced and non injective function defined from a memory size to α(N/H) words, α being an integer strictly greater than 1, N denoting the number of clock cycles between two memory protection operations and H denoting an average number of times a Row Hammer attack shall access one address to fault it.

5. The memory device of claim 1, wherein the transformation function is a hash function or an encryption function.

6. The memory device of claim 4, wherein the transformation function is configured to process one address per clock cycle.

7. The memory device of claim 1, wherein the protection device further comprises a scrambler configured to scramble at least some selected bits of an address identified in an access command received by the memory.

8. The memory device of claim 7, wherein address scrambling by the scrambler is triggered based on a condition related to the access frequency associated with the address.

9. The memory device of claim 7, wherein the memory device comprises a processor, the address scrambling by the scrambler being triggered by said processor of the memory device.

10. The memory device of claim 7, wherein address scrambling by the scrambler is performed using a bit sequence generated by an embedded Random Number Generator.

11. The memory device of claim 7, wherein the selected bits comprise the Least Significant Bits of said address.

12. The memory device of claim 11, wherein said scrambler implements a permutation of the Least Significant Bits (LSB) of said address.

13. The memory device of claim 7, wherein the scrambler uses a random codeword selected from a linear affine code having a minimum distance higher or equal to a predefined value d.

14. A method for protecting a memory device comprising a memory, said memory comprising at least one chip, each chip comprising one or more banks for storing a plurality of bits, each bank comprising a set of rows and columns, each row and column comprising a number of bits, the memory device further comprising a controller configured to generate access commands to the memory, an access command identifying an address corresponding to a given row of the memory and a command operation to be performed on said given row, wherein the method comprises:
applying a transformation function configured to transform an address, in response to a receipt of an access command identifying said address, into a transformed address, wherein said transformation function is a balanced and non-injective transformation function;
storing the transformed address in an address storage data structure depending on a frequency of access associated with said address, said address storage data structure being reset in response to a memory protection operation performed in the memory device; and
the method further comprising determining whether the access frequency associated with an address maintained in the address storage data structure is greater or equal to a threshold, and if so triggering a memory protection operation in the memory from within the memory, wherein the access frequency determination step comprises using a counter to count the accesses to said address between two memory protection operations of the memory, which provides a counter value, the access frequency associated with said address being determined using said counter value, wherein said memory protection operation is a refresh operation.

* * * * *